US012657737B2

(12) United States Patent
Prinsen et al.

(10) Patent No.: US 12,657,737 B2
(45) **Date of Patent: *Jun. 16, 2026**

(54) VIRTUAL POINT SPECIFICATION IN DOMAIN SPECIFIC LANGUAGE FOR MONITORING USER MOVEMENTS

(71) Applicant: Omada Health, Inc., San Francisco, CA (US)

(72) Inventors: Alexander Floyd Prinsen, Denver, CO (US); Brandon Piechowski, San Francisco, CA (US)

(73) Assignee: Omada Health, Inc., San Francisco, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 18/327,830

(22) Filed: Jun. 1, 2023

(65) Prior Publication Data

US 2024/0404079 A1 Dec. 5, 2024

(51) Int. Cl.
G06T 7/246 (2017.01)
G06T 7/73 (2017.01)

(52) U.S. Cl.
CPC ............... G06T 7/246 (2017.01); G06T 7/73 (2017.01); *G06T 2207/30196* (2013.01)

(58) Field of Classification Search
CPC .. G06T 7/246; G06T 7/73; G06T 2207/30196
See application file for complete search history.

(56) References Cited

U.S. PATENT DOCUMENTS

| | | | | |
|---|---|---|---|---|
| 10,795,793 | B1 * | 10/2020 | Arunachalam | ..... G06F 11/0709 |
| 11,238,612 | B2 * | 2/2022 | Ning | ......................... G06T 7/11 |
| 11,348,279 | B1 * | 5/2022 | Akbas | ................... G06V 10/763 |
| 12,321,535 | B2 * | 6/2025 | Bosworth | ............... G06F 3/011 |
| 2013/0204874 | A1 * | 8/2013 | Frey | ...................... G06F 16/353 |
| | | | | 707/737 |
| 2022/0189211 | A1 * | 6/2022 | Sur | ......................... G16H 50/30 |
| 2024/0394908 | A1 * | 11/2024 | Elcock | ................. G06V 40/103 |

* cited by examiner

*Primary Examiner* — Delomia L Gilliard
(74) *Attorney, Agent, or Firm* — Fenwick & West LLP

(57) ABSTRACT

A system generates applications based on a domain specific language (DSL). The applications allow a user to take measurements based on user movements using a client device (for example, a mobile phone) for providing to an expert. The domain specific language includes commands that cause the generated applications to perform various tasks, such as providing specific instructions to the user, starting and stopping recording, taking measurements, and so on. The system compiles the DSL specification to generate executable instructions that are deployed (for example, on a client device such as a mobile phone). The DSL specification allows users to specify virtual points based on multiple landmarks obtained from the images of the user. The DSL specification allows users to specify a point as a stable point for landmarks that are expected to be stationary but move across frames.

20 Claims, 14 Drawing Sheets

400

Receive DSL specification for
application
410

Compile DSL specification to
generate executable instructions for
application
420

Package executable instructions
to generate application package
430

Deploy application package to client
device
440

500

REPEAT

Display instructions to perform specific movements
510

Capture results based on user movement
520

Store results based on user movement
530

Send results to domain expert system
540

600

Receive DSL specification for application
610

Compile DSL specification to generate executable instructions
620

REPEAT

Execute instructions to configure user interface and send for presentation via client device
630

Receive results captured on client device
640

Store results
650

Configure user interface for display on a client devices of the domain expert
660

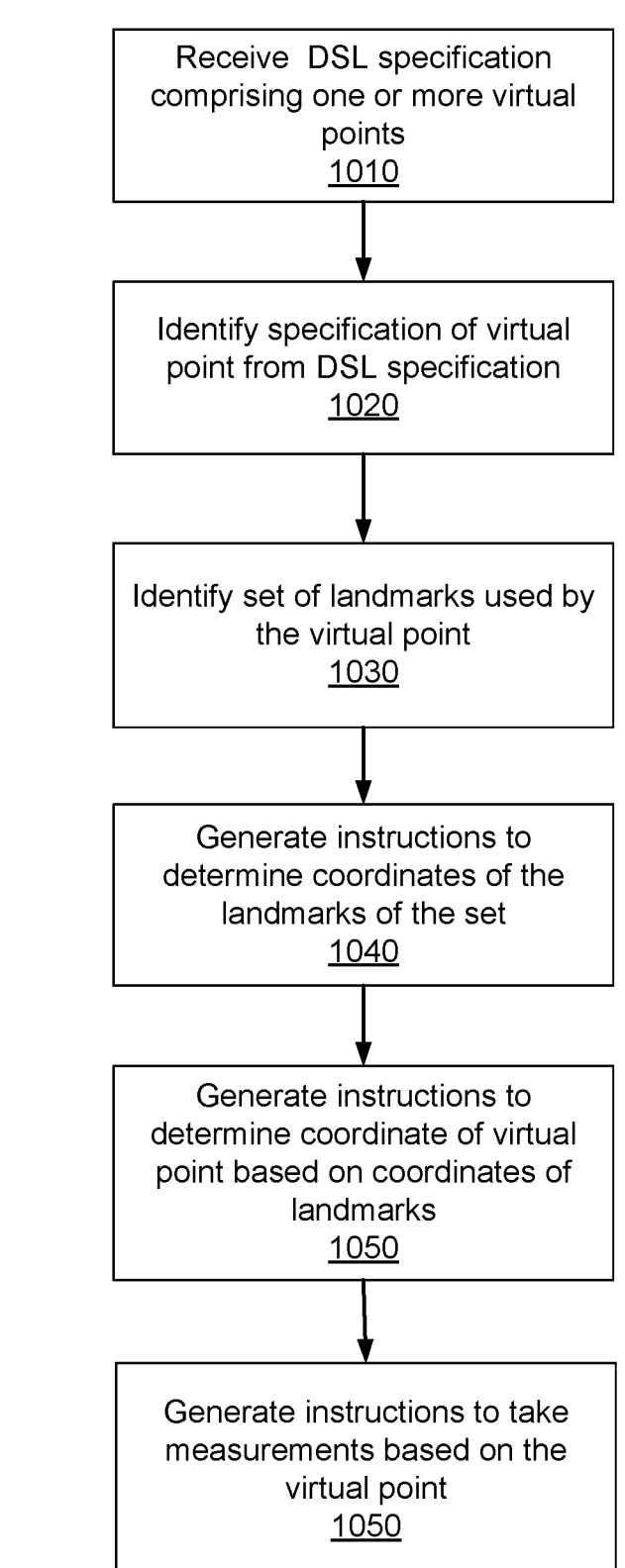

1000

Receive DSL specification comprising one or more virtual points
1010

Identify specification of virtual point from DSL specification
1020

Identify set of landmarks used by the virtual point
1030

Generate instructions to determine coordinates of the landmarks of the set
1040

Generate instructions to determine coordinate of virtual point based on coordinates of landmarks
1050

Generate instructions to take measurements based on the virtual point
1050

VIRTUAL POINT SPECIFICATION IN DOMAIN SPECIFIC LANGUAGE FOR MONITORING USER MOVEMENTS

BACKGROUND

Field of Art

This disclosure relates in general to generation of applications using domain specific languages and, more specifically, to using a domain specific language (DSL) for generating applications for monitoring user movements.

Description of the Related Art

Devices such as mobile phones may be used for various tasks, such as taking measurements of objects, users, and so on. For certain problems, the device may be further used for providing instructions to users as the device is used for taking measurements. Programming a device to perform such actions is a cumbersome task that requires expert knowledge of the devices as well as domain knowledge. For example, an engineering team may perform significant development effort to develop such an application. A dedicated application that executes on such client devices may be developed for performing specific tasks. Such systems are complex to program and difficult to maintain. Furthermore, such a system is difficult to change once it is released in production.

SUMMARY

A system generates applications based on a domain specific language (DSL). The applications allow a user to take measurements based on user movements using a client device (for example, a mobile phone) for providing those measurements to an expert. The domain specific language includes commands that cause the generated applications to perform various tasks such as providing specific instructions to the user, starting and stopping recording, taking measurements, and so on.

According to an embodiment, the system receives DSL specification, including a set of DSL commands, including at least a DSL command for taking a measurement based on user movements. The system compiles the DSL specification to generate a set of instructions for implementing the DSL commands. The set of instructions are configured to perform following steps. A user is instructed to perform a particular user movement. Images of the user performing the user movement are received. Positions of landmarks are determined based on the received images. Each landmark represents a part of the body of the user displayed in an image. A measurement based on the positions of landmarks is obtained from the images. The set of instructions are deployed on a computing system (for example, a client device or an online system). The set of instructions are executed by the computing system to take a set of measurements based on user movements and provide the set of measurements to a target system (for example, a domain expert system) for review.

According to an embodiment, the DSL specification includes a DSL command that specifies a stable point based on a landmark. The stable point allows the system to process a landmark that is expected to stay in one position but keeps moving across frames. The DSL specification identifies such a point as a stable point. The system compiles the DSL specification and generates following instructions associated with the stable point. A plurality of images of a user are received. Each image of the plurality of images displays the landmark at a position such that different images may display the landmark at different positions. A plurality of observations is determined. Each observation represents a position of the landmark in an image from the plurality of images. A position of the stable point corresponding to the landmark is determined based on an aggregate position determined from the plurality of observations. For example, the aggregate position may be determined as an average of a set of positions. A particular measurement is determined using the position of the stable point. For example, an angle may be measured with the stable point as an anchor point representing the vertex of the angle. The generated set of instructions is deployed on a computing system, causing the computing system to take a set of measurements, including the particular measurement, and to provide the set of measurements to a target system for review.

According to an embodiment, the system allows DSL specifications that use virtual points that may be defined as a combination of multiple landmarks. The system receives DSL specification, including at least a DSL command, using a virtual point defined using a plurality of landmarks associated with a user. The system compiles the DSL specification to generate a set of instructions for performing following steps. One or more images of a user are received. A plurality of landmarks used for defining the virtual point are identified. Coordinates representing positions of the landmarks are determined based on the images. Coordinates of the virtual point are determined as a combination of coordinates of positions of each of the plurality of landmarks. A particular measurement is determined based on the virtual point. The set of instructions are deployed on a computing system causing the computing system to take measurements, including the particular measurement, and provide the measurements to a target system for review.

According to an embodiment, the DSL specification includes a DSL command to start recording and a DSL command to stop recording. The DSL specification includes one or more DSL commands for taking measurements between the first DSL command and the second DSL command. The DSL command for taking a measurement based on user movement may specify an angle based on an anchor point, a first point, and a second point. Instructions generated for the DSL command are configured to determine the angle between a first vector formed by the anchor point and the first point and a second vector formed by the anchor point and the second point. The angle may use a virtual point, a stable point, or a combination of the two (i.e., a virtual point marked as a stable point).

The set of instructions generated is deployed on a client device equipped with a camera (for example, a mobile phone). The client device executes the set of instructions and allows the user of the client device to take measurements.

The set of instructions may be deployed on an online system that interacts with a client device equipped with a camera. The client device sends requests to the online system to execute the set of instructions.

The processes disclosed herein may be executed using one or more computer processors. Embodiments include storage media that store the set of instructions generated from the DSL specification. Instructions of the processes may be stored in non-transitory storage media. Computer systems may include computer processors and non-transitory storage media storing instructions of the processes.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 10 is a flow chart illustrating the process for generating instructions from DSL specification that uses one or more virtual points, according to an embodiment.

Figure 1:
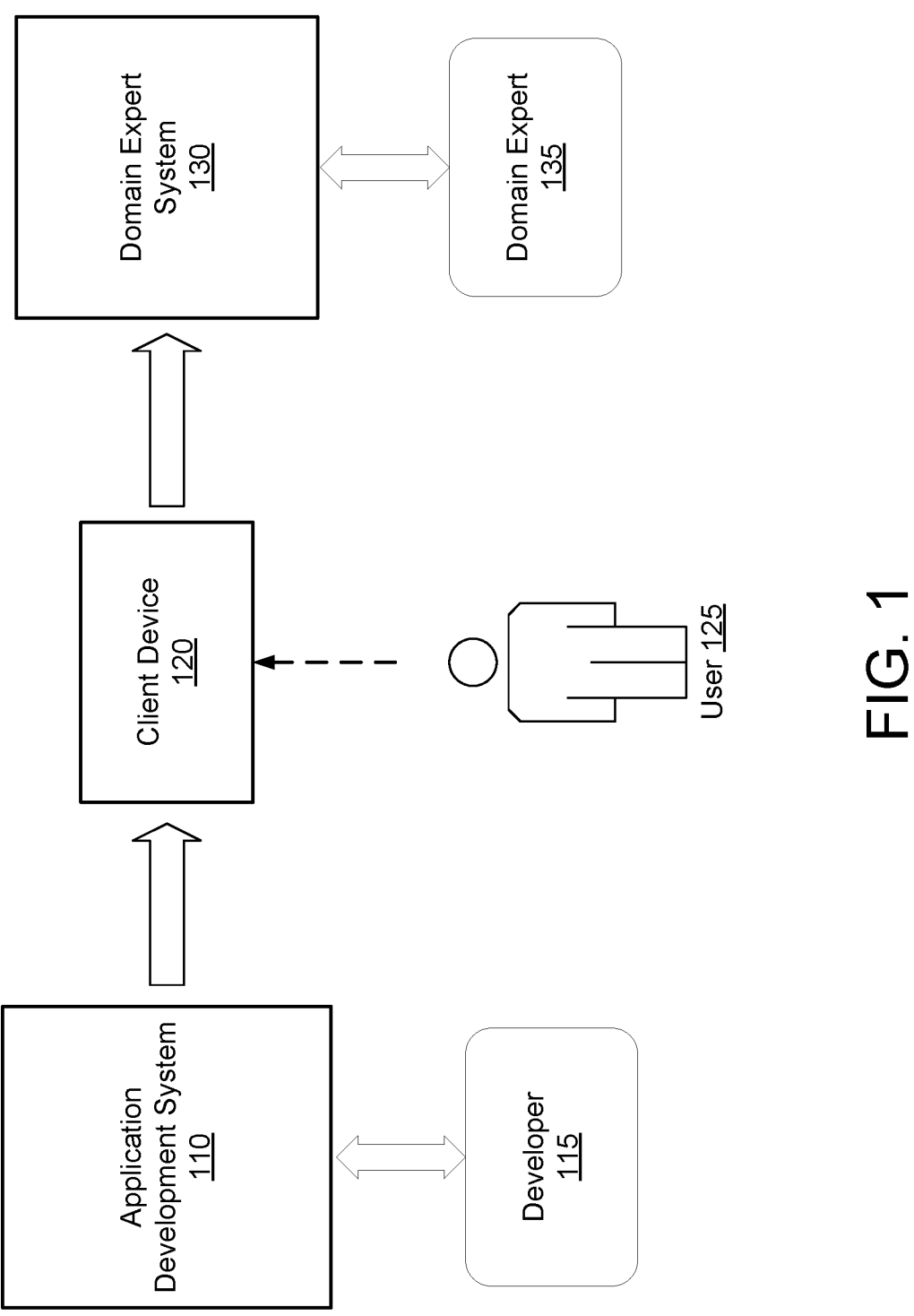
FIG. 1 is a block diagram of a system environment for generating and using applications for monitoring user movements based on a domain specific language, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

A system receives a domain specific language (DSL) specification that allows users to generate an application. According to an embodiment, the DSL allows users to generate applications that take measurements based on user movements observed via cameras of devices. For example, the DSL supports various commands, including commands to provide instructions to users to set up the device, commands to ask users to perform specific set of exercises, commands to take measurements by analyzing images, commands to display overlaying images comparing expected poses and actual poses of user, and commands for storing results and providing results to an expert for review. The application may be executed by a client device (for example, a mobile phone). The data captured by the application may be provided to a domain expert for reviewing and analyzing.

Overall System Environment

FIG. 1 is a block diagram of a system environment for generating and using applications based on a domain specific language, according to an embodiment. The system environment 100 comprises an application development system 110, a client device 120, and a domain expert system 130. In other embodiments, the system environment 100 may include more or fewer components. For example, there may be multiple client devices 120. Actions indicated as being performed by a particular component or system may be performed by other components or systems than those indicated herein.

The application development system 110 receives a DSL specification for an application from a user (for example, a developer). According to an embodiment, the DSL supports constructs for specifying an application for monitoring user movements. The DSL supports various commands. Examples of commands supported by a DSL are as follows. A DSL command configures instructions to ask user 125 to perform various movements so that the application can take measurements as the user performs these movements. Examples of actions performed by a user include moving arms or legs in a specific manner, performing squats, or performing various other types of exercises. A DSL command provides instructions to users describing how to set up the client device 120. This includes providing instructions to the user to position the device correctly, set an angle of the device, as well as describe an initial pose of the user 125 that should be visible in an image captured by the device. A DSL command describes to the user 125 the movements that the user needs to perform, number of repetitions of a particular movement, holding a specific position for a specified amount of time, and so on. A DSL command specifies what measurements to take based on the user action. For example, the system may measure an angle of an arm with respect to a landmark in the body such as the shoulder. A DSL command may instruct the application to overlay a specific image on the image being captured by a camera of the device to indicate an ideal position compared to the actual user image. A DSL command may send results determined by the application to a target system (for example, the domain expert system 130).

The application development system 110 generates executable instructions for an application that may be deployed on a client device 120 of a user. The client device 120 installs the application generated by the application development system 110. The client device 120 may be a smart phone. The application provides instructions to the user of the client device for monitoring user movements. For example, the application may instruct the user to take an initial pose. The application may further instruct the user to move specific parts of the user's body in specific ways to take measurements useful for a physiotherapy expert. The user movements monitored by the application executing on the client device 120 are stored and provided to the domain expert system 130.

The domain expert system 130 is a system (for example, a client device) of an expert user (for example, a domain expert 135) who can review the user movements and corresponding measurements as provided by the client device.

The domain expert system 130 may provide feedback to the user 125 based on the information received from the domain expert 135.

In some embodiments, the application development system 110 is an online system that receives requests from client devices. A developer 115 may provide the DSL specification for an application. The application development system 110 generates the executable instructions for the application and hosts the application as a service. The client device 120 may interact with the application development system 110 to execute the application. For example, the application development system 110 may configure user interfaces and send them to the client device 120, and any requests or results are received from the client device 120 by the application development system 110. The application development system 110 may further interact with the domain expert system 130 to provide the results for displaying to the domain expert 135 (for example, to a physiotherapy expert for review). In this embodiment, the domain expert system 130 may act as a client device that simply displays a user interface configured by the application development system 110.

Each component shown in FIG. 1 represents one or more computing devices. A computing device can be a conventional computer system executing (for example, a Microsoft™ Windows™-compatible operating system (OS), Apple™ OS X, and/or a Linux distribution). A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

System Architecture

Figure 2:
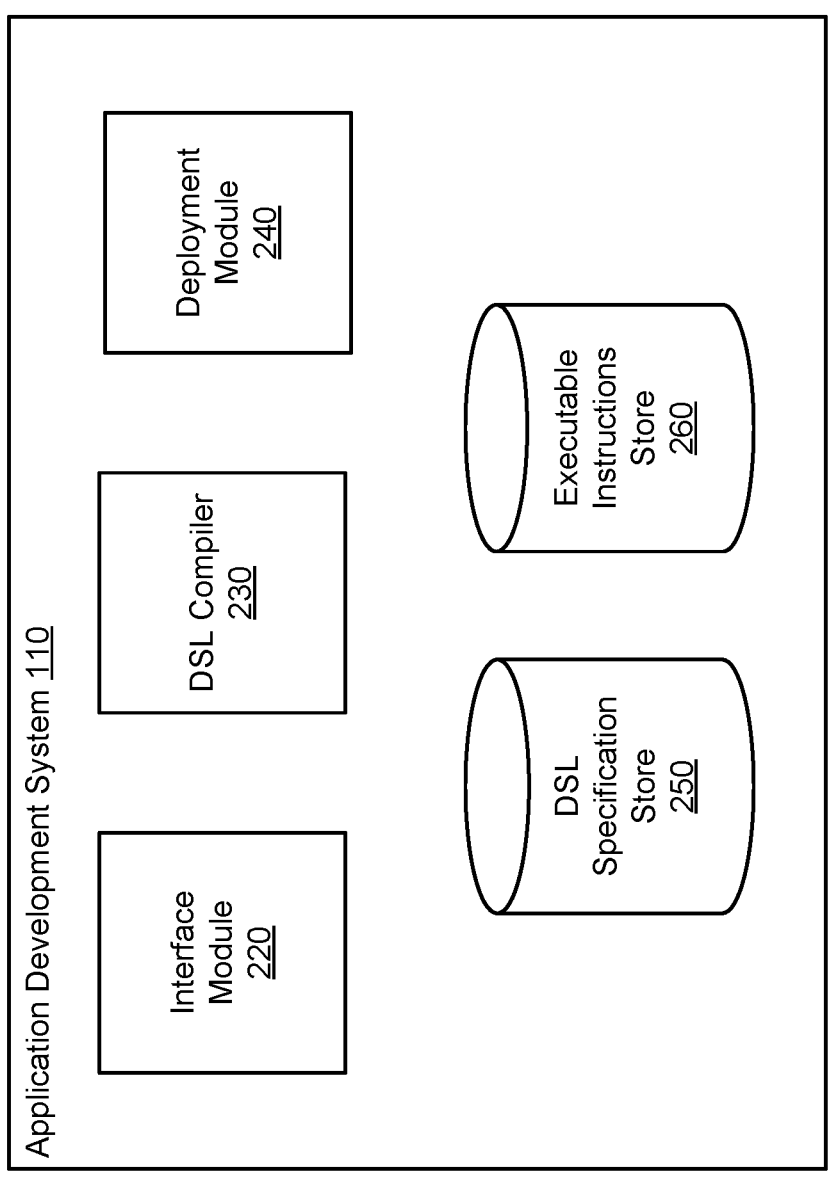
FIG. 2 is a block diagram illustrating components of an application development system for generating applications from DSL specification according to an embodiment.

FIG. 2 is a block diagram illustrating components of an application development system for generating applications from DSL specification according to an embodiment. The application development system 110 includes an interface module 220, a DSL compiler 230, a deployment module 240, a DSL specification store 250, and an executable instruction store 260. Other embodiments can have different and/or other components than the ones described here, and that the functionalities can be distributed among the components in a different manner.

The interface module 220 configures and displays user interfaces that allow users, such as the developers 115, to provide DSL specification for an application. In some embodiments, the interface module 220 provides application programming interfaces (APIs) that can be invoked to provide the DSL specification. In other embodiments, the interface module 220 configures user interfaces that can be used by users to interactively provide the DSL specification.

The DSL specification received from users is stored in the DSL specification store 250. The DSL specification store 250 may be a file system or a database (for example, a document store). In some embodiments, the DSL specification store 250 allows users to create multiple versions of a DSL specification for an application.

The DSL compiler 230 compiles the DSL specification to generate executable instructions for the application. The executable instructions generated by the DSL compiler 230 are stored in the executable instructions store 260. The executable instructions store 260 may be a file system or a database (for example, a document store).

The DSL compiler parses the DSL specification and generates a data structure representing the DSL specification. The DSL compiler may generate instructions for a target programming language such as PYTHON, JAVA, or any other programming language. The instructions generated by the DSL compiler 230 may be further compiled using a compiler of the target programming language to generate executable instructions or may be interpreted using an interpreter.

According to an embodiment, the DSL uses JSON (JavaScript Object Notation) syntax but is not limited to a specific syntax. For example, the DSL may use an XML schema, YAML schema, or any proprietary syntax. The DSL specification is represented using data structures that are serializable and can be validated. The serialized representation can be used for storing or transmission.

The deployment module 240 deploys the executable instructions of the application generated from the DSL specification. According to some embodiments, the deployment module 240 creates a software artifact (for example, a package) based on the executable instructions of the application. The software artifact is transmitted to the client device 120 that executes the application. The software artifact may be deployed using an online system that receives requests and executes instructions of the application based on the requests. The software artifact may be deployed using a cloud platform.

Figure 3:
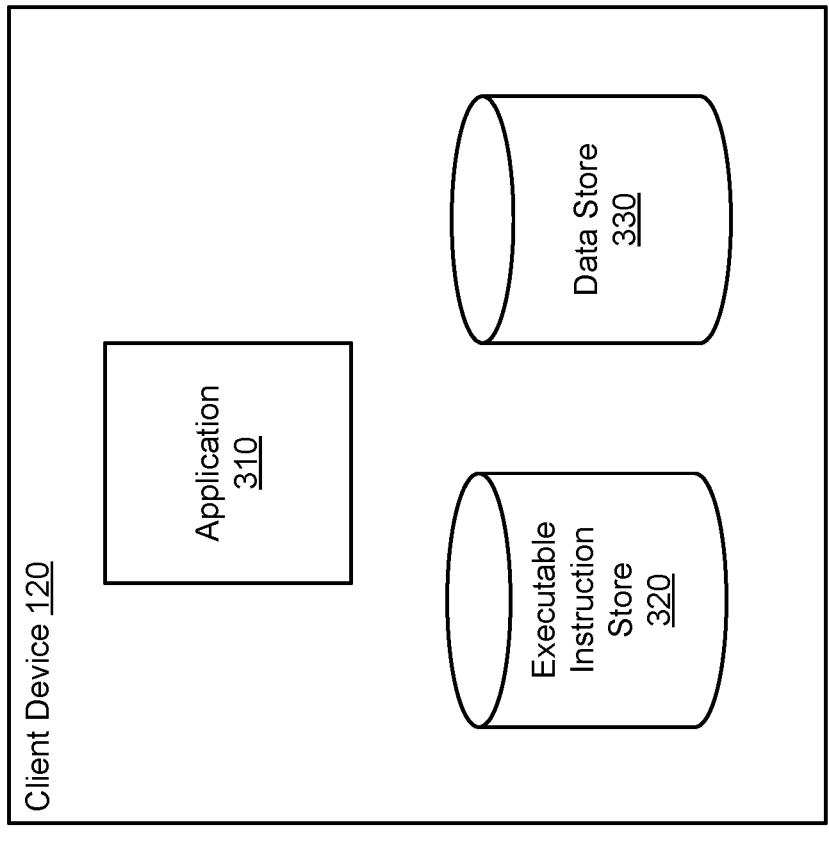
FIG. 3 is a block diagram illustrating components of a client device executing an application generated from DSL according to an embodiment.

FIG. 3 is a block diagram illustrating components of a client device executing an application generated from DSL according to an embodiment. The client device 120 includes an application 310, executable instructions store 320, and a data store 330. Other embodiments can have different and/or other components than the ones described here, and that the functionalities can be distributed among the components in a different manner.

The executable instructions store 320 stores the instructions for the application 310. The executable instructions are received from the application development system 110 and are generated by the DSL compiler 230 by compiling a DSL specification. The application 310 executes and interacts with the user 125. The application 310 collects data based on the interactions with the user. The data collected is stored in the data store 330. The data stored in the data store 330 is provided to the domain expert system 130 for review by the domain expert 135.

In some embodiments, the executable instructions store 320 and the data store 330 are in the application development system 110, and the application of the client device 120 that interacts with the application development system 110 is a client application, such as an internet browser, that displays user interfaces configured by the application development system 110 or by any online system that hosts the executable instructions for the application.

DSL Specification

According to an embodiment, the DSL specification includes an assessment definition that comprises a script of DSL commands for execution during a specific assessment. Each command specifies instructions for the system to execute one or more steps of the assessment process. An example command sequence for a particular assessment is as follows. The following example definition shows command names and not the full DSL specification of each command.

```
[
  RequireConfirm, // prompt patient to position phone
  StartRecording, // once the phone is positioned, start the video recording
  PoseBody, // prompt the user to get in position for the movement
  ShowInstructions, // tell the user to get ready for rep (i.e., repetition) #1
  Measure Angles, // measure rep #1
  ShowInstructions, // tell the user to get ready for rep #2
  MeasureAngles, // measure rep #2
  Show Instructions, // tell the user to get ready for rep #3
  MeasureAngles, // measure rep #3
  StopRecording, // end the video recording segment
  ShowResultsScreen, // show the result screen
]
```

The above assessment definition includes (1) a Require-Confirm command that prompts the user 125 to position the client device, (2) a StartRecording command to instruct the client device to start recording, (3) a StopRecording command to instruct the client device to stop recording, (4) a PoseBody command instructing the user to set up initial pose, (5) one or more ShowInstructions command to provide instructions to the user 125 to perform specific actions, (5) one or more MeasureAngles commands to instruct the client device to take measurements based on the user actions, and (6) a ShowResultsScreen to show results of the measurements.

Following is an example syntax of a RequireConfirm command. The command specification includes a type of the object specified as a Command; a name of the command specified as RequireConfirm; and a configuration of the command. The configuration specifies attributes such as instructions for the user 125 (e.g., instructions asking the user to place the client device in a specific manner), an attribute specifying further details of the instructions (e.g., details asking the user to prop the phone against a wall with the screen facing the user), an attribute specifying an confirmation text (e.g., "next"), and a URL (uniform resource locator) identifying an image to overlay on the display.

```
{
  " _type": "Command",
  "command": "#CommandName.RequireConfirm",
  "config": {
    "instructions": "Place your phone upright on the floor",
    "detail": "Prop the phone against a wall with the screen facing you",
    "confirmText": "Next",
    "imageUrl": "https://abc.com/image.png"
  }
}
```

Following is syntax of the PoseBody command.

```
{
  "_type": "Command",
  "command": "#CommandName.PoseBody",
  "config": {
    "instructions": {
      "initial": "Face the camera. Center your lower body in the frame.",
      "poseDetected": "Hold that pose!",
      "outOfPosition": "Try backing up so your knees are in the frame."
    },
    "holdForMs": 3000,
    "requiredVisibleLandmarks": [
      "#Landmark.LeftKnee",
      "#Landmark.RightKnee",
      "#Landmark.LeftHip",
      "#Landmark.RightHip"
    ]
  }
}
```

The command specification for PoseBody includes the type of the object; the name of the command; a configuration of the command. The configuration specifies various attributes including (1) a set of instructions for the user 125, (2) a delay specification holdForMs that instructs the user to hold the pose for at least a threshold amount of time, and (3) a set of required visible landmarks that need to be visible in the images captured. A landmark refers to a specific part of the body or a specific point in a body of the user 125 (for example, left knee, right knee, left shoulder, right shoulder, left hip, right hip, and so on). The landmarks may be identified by the client device 120 using image recognition techniques. The system generates instructions that monitor the images for all the required landmarks. If the required landmarks are not visible in an image captured using the pose of the user, the application may provide instructions to the user to adjust the pose. For example, an outOfPosition instruction may specify the message to provide to the user if all required landmarks are not visible. The message may ask the user to adjust the user's position with respect to the device (for example, by backing up and ensuring that a specific body part is in the frame of the image captured). The instructions may include an instruction poseDetected that specifies a message to provide to the user if the application determines that the user has a required pose. For example, the application may instruct the user to hold the pose.

Following is an example MeasureAngles command that instructs the client device to measure a specific angle.

```
{
  "_type": "Command",
  "_comment": "Rep #1",
  "command": "#CommandName.MeasureAngles",
  "config": {
    "measureAngles": [
      {
        "_type": "MeasuredAngle",
        "name": "$HipDrop_1",
        "displaySkeleton": true,
        "displayArc": false,
        "displayMeasurement": false,
        "config": {
          "mode": "#MeasurementMode.Max"
          "acceptedRange": {
            "min": 0,
            "max": 35
          }
        },
        "angle": {
          ...
        },
      }
      ...
    ],
    "duration": { "repTimeMs": 6000 },
    "instructions": { "in": "Squat down." }
  }
}
```

The MeasureAngles command includes the attributes described above including type, name, and configuration. The configuration specifies attributes such as measureAngles that identifies angles to be measured, duration for which a pose should be held to be able to take the measurement, and instructions for the user. The measureAngles attribute may specify one or more objects of type MeasuredAngle. The MeasuredAngle object specifies display attributes describing the display elements of the user interface while taking the measurement (for example, a boolean displaySkeleton attribute that specifies whether a skeleton of the angle should be shown, a boolean displayArc attribute that specifies whether an arc illustrating the angle should be shown, a boolean displayMeasurement attribute that specifies whether the measurement of the angle should be shown, and so on).

The MeasuredAngle specifies an angle object that describes the details of the angle to be measured. An example specification of the angle object is as follows.

```
"angle": {
    "_type": "Angle",
    "direction": "$HipDropRotation",
    "anchor": {
        "_type": "Point",
        "landmark": "$SquatSideHip"
    },
    "from": {
        "_type": "Point",
        "_comment": "Ideal Hip position (with no drop)",
        "x": "$OppositeSideHip",
        "y": "$SquatSideHip"
    },
    "to": {
        "_type": "Point",
        "landmark": "$OppositeSideHip"
    }
}
```

The angle object specifies the angle using a set of points and a direction in which the angle is measured. The set of points includes an "anchor" point, a "from" point, and a "to" point. The system measures the angle obtained by rotating a vector from the "anchor" point to the "from" point to a vector from the "anchor" point to the "to" point. The rotation is performed along the direction specified by the "direction" attribute. Each point is specified using an object of type point that has an optional comment attribute. The point may be specified using a landmark representing a feature or part of the body that the system recognizes using image recognition techniques. Details of how a point is specified for an angle are further described herein.

Overall Process

Figure 4:
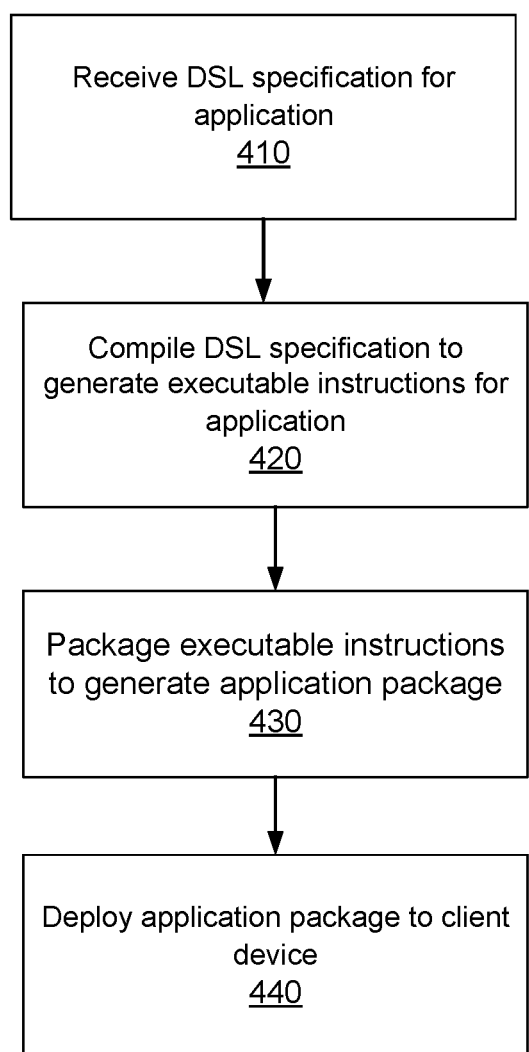
FIG. 4 is a flow chart illustrating the process for generating an application from DSL specification according to an embodiment.

FIG. 4 is a flow chart illustrating the process for generating an application from DSL specification according to an embodiment. Other embodiments can perform the steps of FIG. 4 in different orders. Moreover, other embodiments can include different and/or additional steps than the ones described herein. The steps of the process may be executed by a system (for example, the application development system 110).

The application development system 110 receives 410 a DSL specification for an application. The application development system 110 compiles 420 the DSL specification to generate executable instructions for the application. The application development system 110 packages the executable instructions to generate a software artifact (for example, an application package). The application development system 110 deploys 440 the application package to a client device 120. The client device 120 installs the application from the application package and executes the application to perform interactions with a user and collect data (for example, measurement data) from the user.

Figure 5:
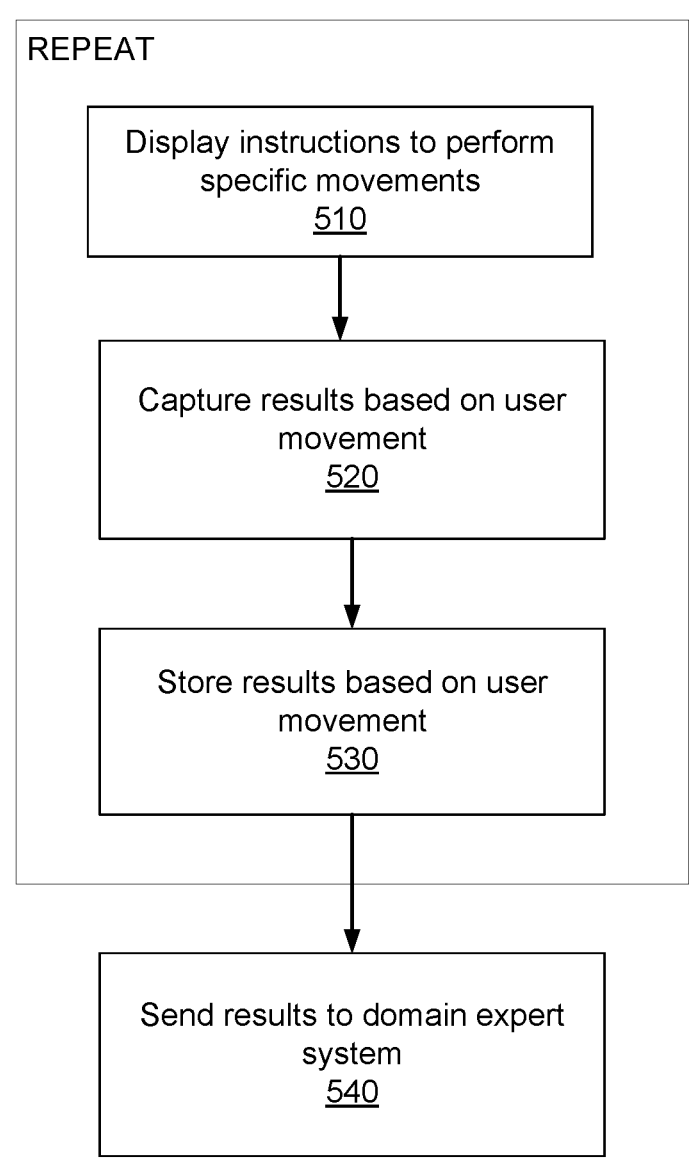
FIG. 5 is a flow chart illustrating the process for executing the application generated from DSL specification on a client device according to an embodiment.

FIG. 5 is a flow chart illustrating the process for executing the application generated from DSL specification on a client device according to an embodiment. Other embodiments can perform the steps of FIG. 4 in different orders. Moreover, other embodiments can include different and/or additional steps than the ones described herein. The steps of the process may be executed by a system (for example, the client device 120).

The client device 120 interacts with the user 125 by repeatedly performing the steps 510, 520, 530. The client device 120 displays 520 instructions to the user to perform specific movements. The client device 120 captures results based on the user's movements. According to an embodiment, the client device 120 captures images or video of the user performing the movements and analyzes the images or video to determine results based on the user movements. The client device 120 stores 530 the results determined based on the user movements. Once the results are captured based on a session of interactions with the user, the client device 120 sends 540 the results to the domain expert system 130. The domain expert system 130 displays the results to the domain expert 135 for getting expert opinion.

Figure 6:
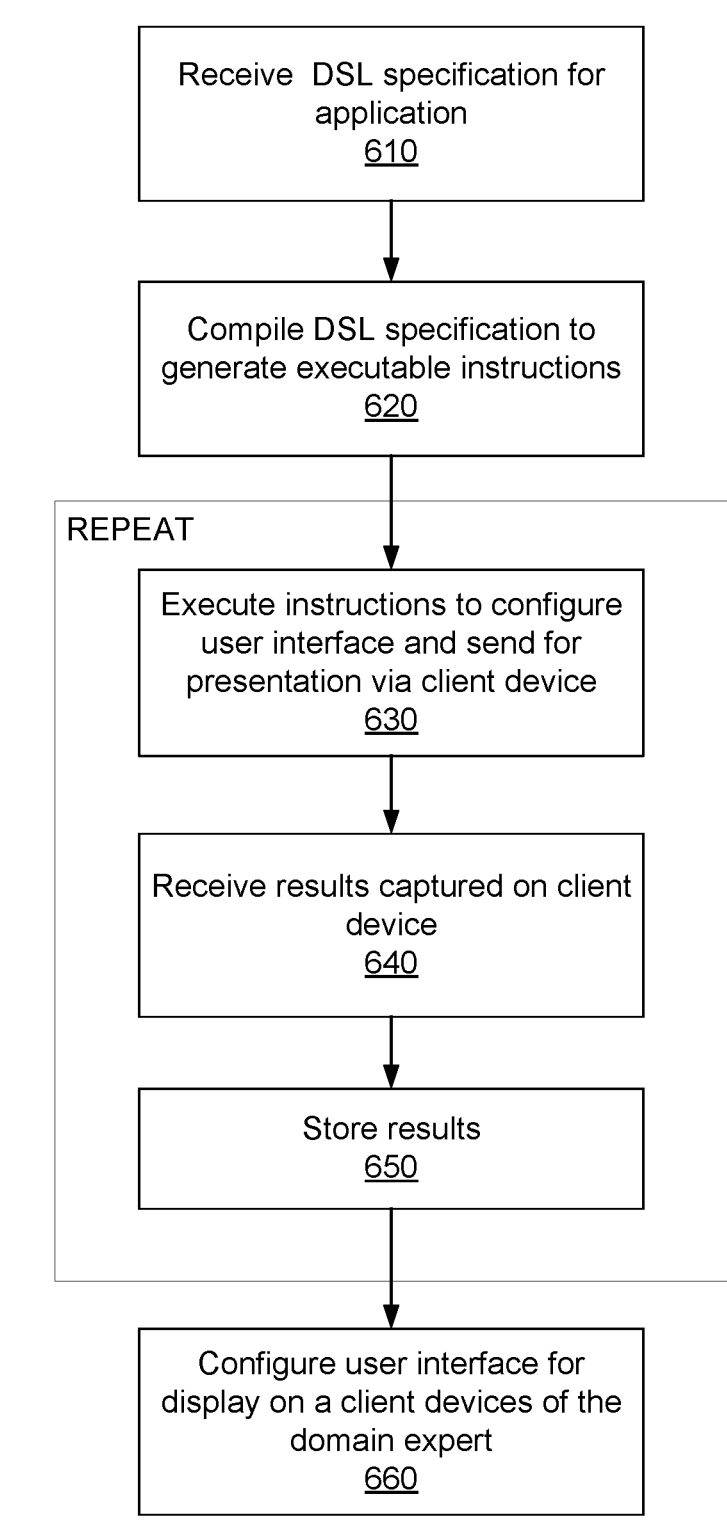
FIG. 6 is a flow chart illustrating the process for generating an application from DSL specification and executing the application on an online system according to an embodiment.

FIG. 6 is a flow chart illustrating the process for generating an application from DSL specification and executing the application on an online system according to an embodiment. Other embodiments can perform the steps of FIG. 4 in different orders. Moreover, other embodiments can include different and/or additional steps than the ones described herein. The steps of the process may be executed by a system (for example, the application development system 110 or any online system).

The system receives 610 DSL specification for an application. The system compiles 620 the DSL specification to generate executable instructions for the application. The system hosts the application as a service that receives requests and processes the requests.

The system interacts with the client device 120 to repeatedly perform steps 630, 640, and 650. Accordingly, the system executes 630 instructions to configure a user interface for sending to the client device 120. The client device 120 displays the user interface to perform an interaction with the user 125. The client device 120 receives results based on the user interaction and sends the results to the system. Accordingly, the system receives 640 the results determined based on the user interaction with the client device 120. According to an embodiment, the system receives the images/video captured by the client device 120 to determine the results. The system stores 650 the results.

Once all the results based on the user interactions with client device 120 are collected, the system configures 660 a user interface for display on a client device of the domain expert 135.

Virtual Point in DSL Specification

Several points used in measurements of a user are based on landmarks that represent points on the human body (or parts of the human body) that the client device identifies using object recognition techniques. The landmarks may correspond to joints or regions (or parts) of the human body. However, the domain expert (for example, the physical therapist) may prefer to use measurements based on points that do not correspond to the standard landmarks identified by the system.

Figure 7:
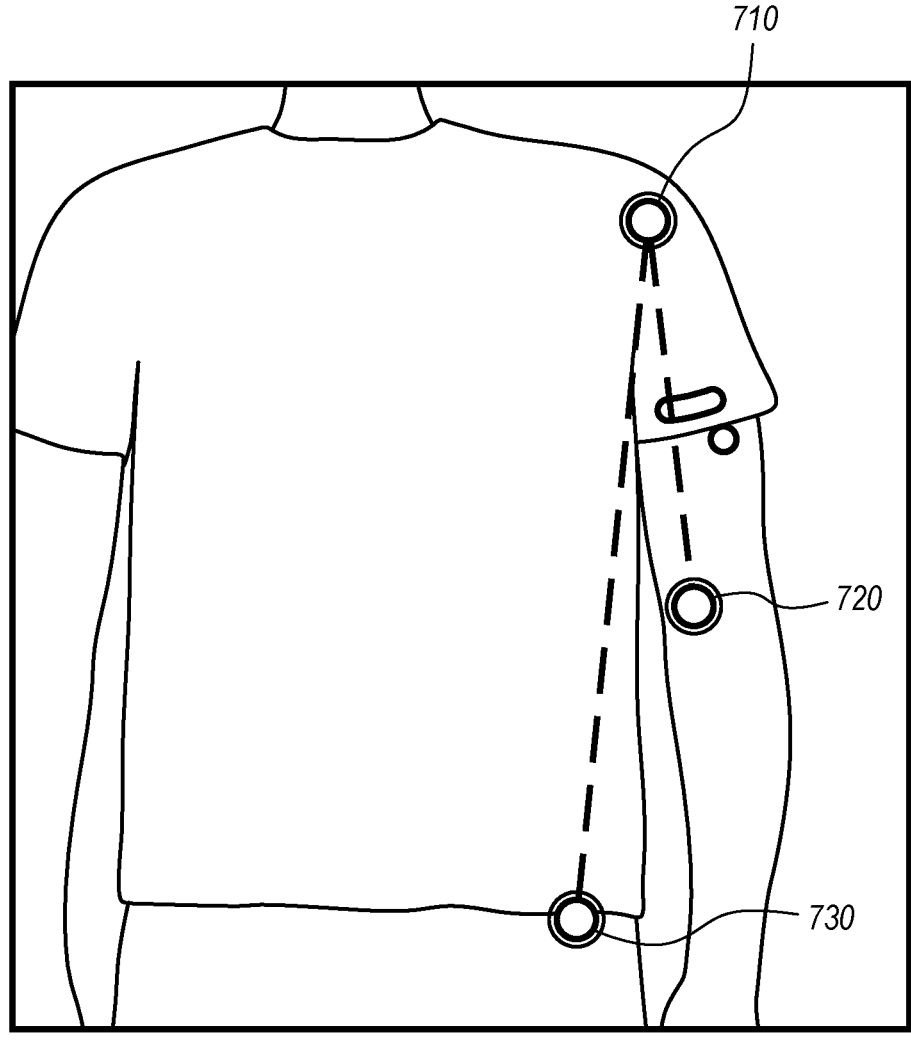
FIG. 7 illustrates an assessment made using a standard set of landmarks, according to an embodiment.

The DSL specification allows users to specify imaginary or virtual points for taking measurements. FIG. 7 illustrates an assessment made using a standard set of landmarks, according to an embodiment. More specifically, FIG. 7 shows a left shoulder range of motion assessment using a standard set of landmarks. The system identifies three landmarks in the image of the user: the landmark 710 representing left shoulder, landmark 720 representing left elbow, and landmark 730 representing left hip. The measurement is performed using the angle between the vector formed by landmarks 710 and 730 and the vector formed by landmarks 710 and 720. A domain expert would prefer taking measurement of the angle from a point that is directly below the landmark 710. Such a point provides a stable and more reliable measurement of the angle since the point corresponding to the landmark 730 may vary across users as well as move when the user is moving. The abduction measurement sets the shoulder and 'hip' to be aligned on a vertical plane.

Figure 8:
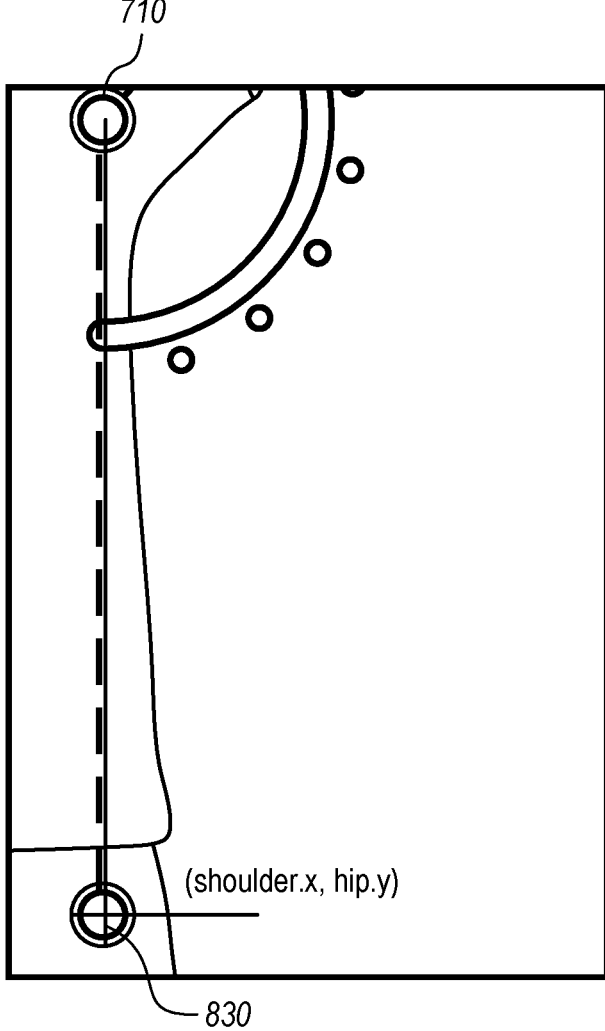
FIG. 8 illustrates a virtual point specified using landmarks, according to an embodiment.

The DSL specification allows users to define virtual points that are specified by composing multiple points that may be based on landmarks or other features. FIG. 8 illustrates a virtual point specified using landmarks, according to an embodiment. Each landmark or virtual point is represented using a set of coordinates (for example, a pair of coordinates (x, y), including an x coordinate and a y coordinate). Other embodiments may use more of fewer coordinates (for example, a system may use three coordinates including an x coordinate, a y coordinate, and a z coordinate). Other embodiments may use a different coordinate system (for example, a polar coordinate system). The virtual point 830 is specified using a combination of landmarks 710 and 730 representing the left shoulder and left hip respectively. The virtual point represents a stationary arm for an angle anchored at the left shoulder, directly below the left shoulder, at the height of the left hip. Accordingly, the virtual point 830 is specified by using the x coordinate of the landmark 710 corresponding to the left shoulder and the y coordinate of the landmark 730 representing the left hip. The virtual point 830 represents a point that is more useful for taking measurements (for example, for measuring angles).

Another complex movement is the single leg squat used for measuring two key angles, the 'valgus' of the squatting knee (deviation from an ideal 'straight line' from hip, knee and ankle), and 'hip drop', when the opposite hip (nonsquatting hip) rises or falls relative to an ideal horizontal alignment with the squatting hip. The measurement, 'hip drop', is challenging to measure with a standard library of body landmarks. The system allows a user to specify a point based on the squatting hip as the 'anchor' for measurement, and the opposite hip as the moving arm.

Figure 9:
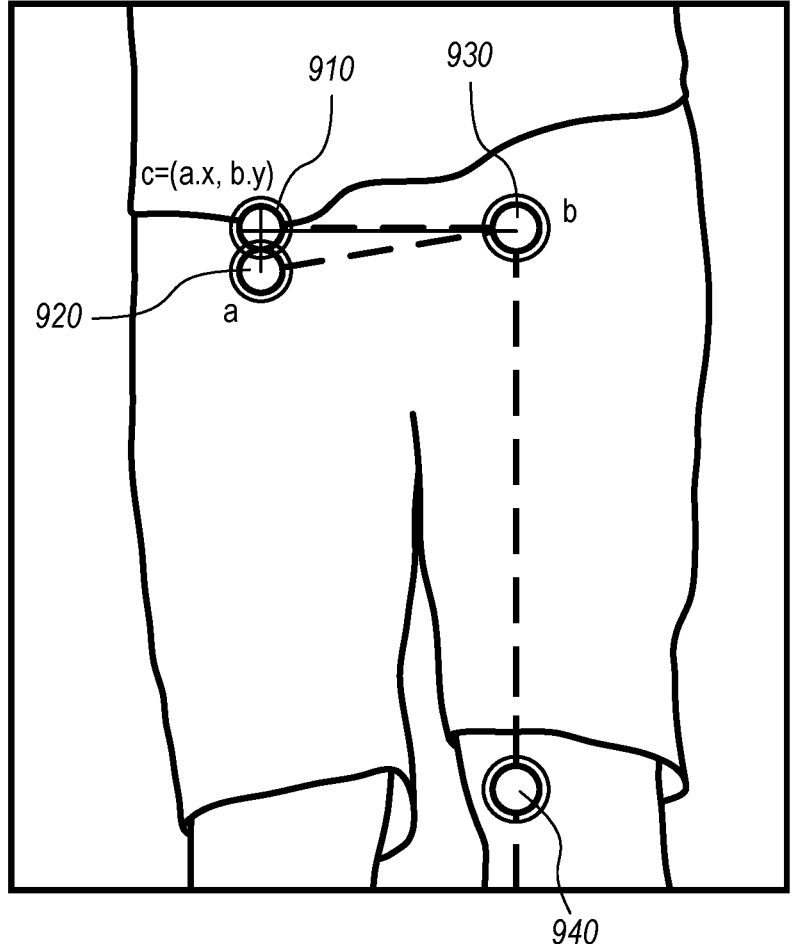
FIG. 9 illustrates another virtual point specified using landmarks, according to an embodiment.

FIG. 9 illustrates another virtual point specified using landmarks, according to an embodiment. The figure illustrates various points, including point 910 representing the landmark corresponding to right hip, point 930 representing the landmark corresponding to left hip, and point 940 representing the landmark corresponding to left knee. The system allows users to specify a virtual point 920 representing an ideal hip. The virtual point corresponding to an ideal hip is specified as the point having the x coordinate that corresponds to the x coordinate of the opposite hip and the y coordinate that corresponds to the y coordinate of the squatting hip. For example, if the squatting hip is the right hip, the ideal hip is specified as the point having the x coordinate that corresponds to the x coordinate of the left hip and the y coordinate that corresponds to the y coordinate of the right hip.

Accordingly, the system allows the DSL specification to include virtual points based on combinations of coordinates of landmarks. The virtual points may be used to define angles. The system generates instructions that evaluate the coordinates of the virtual points based on the coordinates of the landmarks used in the definition of the virtual point. An example DSL specification based on virtual points is as follows. The following example DSL specification describes an object representing an angle that uses one or more virtual points.

```
{
    "_type": "Angle",
    "direction": "$HipDropRotation",
    "anchor": {
        "_type": "Point",
        "landmark": "$SquatSideHip"
    },
    "from": {
        "_type": "Point",
        "_comment": "Ideal Hip position (with no drop)",
        "x": "$OppositeSideHip",
        "y": "$SquatSideHip"
    },
    "to": {
        "_type": "Point",
        "landmark": "$OppositeSideHip"
    }
}
```

The angle specifies an anchor point that represents the vertex of the angle and a from point and a to point. The angle direction is specified using the attribute "direction." The angle is between two vectors, the first vector from the "anchor" point to the "from" point and the second vector from the "anchor" point to the "to" point. The "anchor" point is defined as the landmark representing the squat side hip. The "to" point is defined as the landmark representing the opposite side hip. The "from" point is defined as a virtual point that is a combination of coordinates of the landmark representing the squat side hip and the landmark representing the opposite side hip. More specifically, the DSL specification defines the value of the x coordinate of the "from" point as the x coordinate of the landmark representing the opposite side hip and the y coordinate of the "from" point as the y coordinate of the landmark representing the squat side hip. According to various embodiment, the variables such as $HipDropRotation, $SquatSideHip, $OppositeSideHip are configurable and may be set by an expert user, for example, a system administrator. For example, a developer or administrator who defines an assessment definition may specify certain configuration options and associate them with some variables. An expert, for example, a physical therapist may select specific options for a particular end user such as a patient. For example, if a user has injured a left shoulder, a physical therapist may use the "Left" option for certain variables. For certain variables, the system may automatically assign values based on information obtained about the end user (e.g., patient). For example, certain user profile information may be available for a specific end user and may be substituted for some of the variables.

The system generates the instructions for the application based on the DSL specification. Accordingly, the instruction to assign the coordinates of the virtual point defined using a set of landmarks comprise instructions to determine the coordinates of all the landmarks of the set of landmarks and then using the coordinates of the landmarks of the set of landmarks to determine the coordinates of the virtual point. The coordinates of the virtual points may be further used to determine some measurements (for example, angle measurements).

FIG. 10 is a flow chart illustrating the process for generating instructions from DSL specification based on virtual points, according to an embodiment. The steps may be performed by a system (for example, the application development system 110). The system receives 1010 DSL specification that includes one or more objects specified using virtual points. A virtual point is specified by combining multiple landmarks. The system generates instructions for the application from the DSL specification. The system identifies 1020 specification of a virtual point from the DSL specification. The virtual point may be part of a specification of another object (for example, an object comprising specification of an angle), which in turn may be part of a specification of a measurement.

The system generates instructions for the virtual point as follows. The system identifies 1030 the set of landmarks used for specifying the virtual point. The system generates instructions to determine coordinates of the landmarks of the set of landmarks. The system may generate instructions (or invoke a function from an existing library) for determining the coordinates by processing one or more images captured by the client device 120. The system generates 1050 instructions to determine coordinates of the virtual point by combining the coordinates of the landmarks of the set of landmarks. For example, the set of landmarks may include landmarks L1 and L2 having coordinates (x1, y1) and (x2, y2) respectively. Based on the DSL specification, the system generates instructions for determining coordinates of the virtual point (x3, y3). The instructions may specify that x3=x1 and y3=y2. Based on a different specification, the system may generate instructions to determine (x3, y3) using the following equations: x3=x2 and y3=y1. The coordinates (x3, y3) of the virtual point may be any functions of the coordinates of the landmarks (for example, x3=f1 (x1, x2) and y3=f2 (y1, y2), where f1 and f2 are functions specified using an expression or a set of instructions). Similarly, the coordinates (x3, y3) of the virtual point may be a different function, x3=g1 (x1, x2, y1, y2) and y3=g2 (x1, x2, y1, y2), where g1 and g2 are functions specified using an expression or a set of instructions. The system further generates instructions for taking a measurement based on the virtual points. For example, the generated instructions may determine an angle based on the virtual point.

Figure 11:
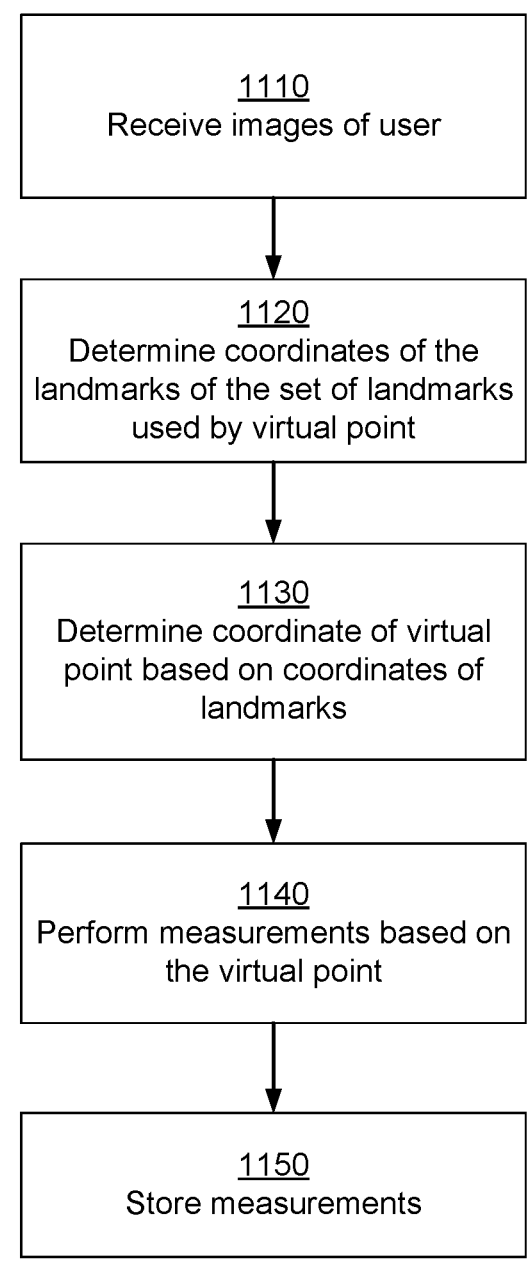
FIG. 11 is a flow chart illustrating the process for executing instructions generated from DSL specification that uses one or more virtual points, according to an embodiment.

FIG. 11 is a flow chart illustrating the process for executing instructions generated from DSL specification based on virtual points, according to an embodiment. The instructions may be deployed for execution on any system (for example, a client device 120) or on an online system (for example, the application development system 110). The steps performed by the process shown in FIG. 11 are performed by executing instructions generated by the process of FIG. 10.

The system receives 1110 images of the user (for example, the images may be captured by cameras of the client device 120). The client device 120 may perform the remaining steps of the process shown in FIG. 11 or send the images for processing by an online system. The system determines 1120 coordinates of the landmarks of the set of landmarks used by the virtual point. The system determines 1130 coordinates of the virtual point based on the coordinates of the landmarks of the set of landmarks used by the virtual point. The system performs 1140 measurements based on the virtual points (for example, by determining an angle based on the virtual point). The system stores 1150 the measurements or sends the results of the measurements to a different system (for example, the domain expert system 130) for analysis by a domain expert 135.

Stable Points for Measurements

A challenge encountered while taking measurements of a user 125 via client device 120 is that landmarks such as physical joints of the user may change position during the movement. For purposes of taking measurements for analysis by an expert, such as physiotherapy expert, the positions of such landmarks are expected to be anchored so that measurements can be taken with respect to the anchored points.

Figure 12:
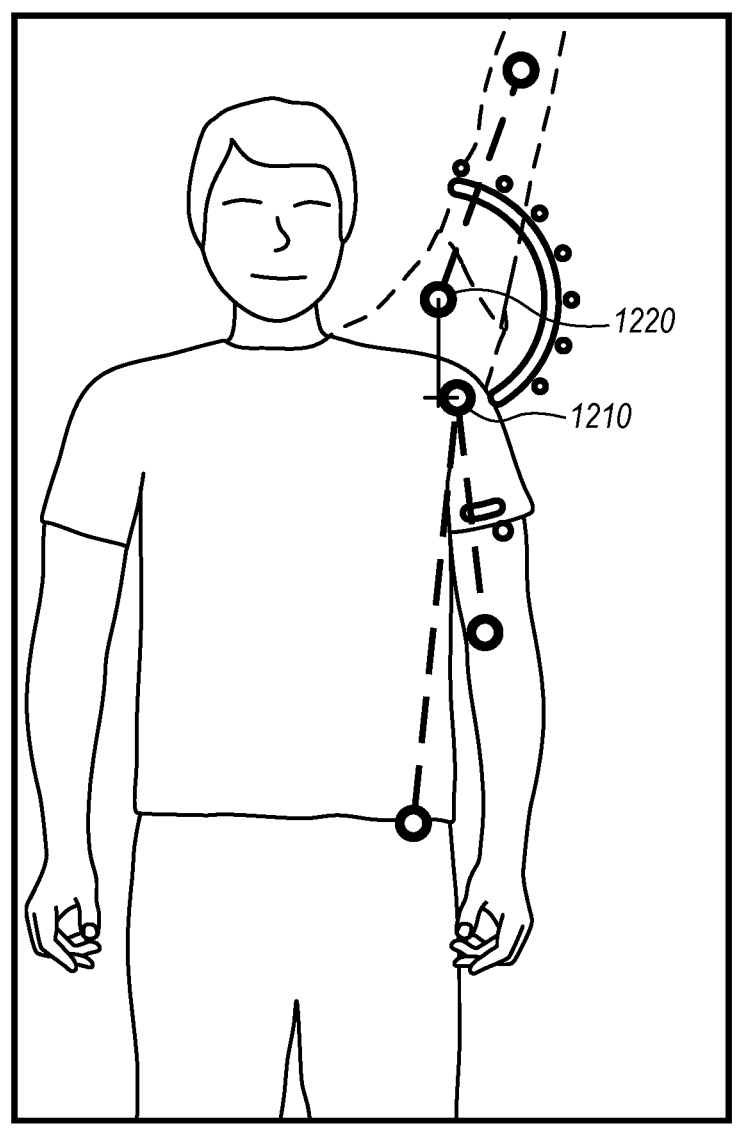
FIG. 12 illustrates movement in points based on landmarks, according to an embodiment.

For example, an angle may be measured when a user moves the arm. The angle has the vertex at the shoulder of the user. If the vertex keeps moving during the measurement, the measurements are less accurate. FIG. 12 illustrates movement in points based on landmarks, according to an embodiment. FIG. 12 shows a measurement corresponding to a shoulder abduction range of motion test. The image overlays two images taken at different points in time during the movement of the arm by the user. The landmark shoulder moves during the motion from point 1210 to point 1220. The movement can be observed with respect to stationary objects in the image that do not move across frames. For example, the head of the user is stationary and does not move across the frames as the user moves the arm. The shoulder is preferably used as an anchor point to measure the angle when the user moves the arm. If the anchor point represented by the shoulder moves while taking measurements, the resulting measurement is inaccurate. Therefore, it is challenging to take measurements when certain points used for taking measurements are not stable.

Embodiments address such challenges in assessing computer vision assisted assessments. Accordingly, the DSL specification allows users to define a point or a landmark as a stable point (also referred to as a stabilized point). The system ensures that the landmark or the point is treated as stable for measurement purposes even if the landmark in the images being captured keeps moving.

The DSL, according to various embodiments, supports capabilities to define composite points as disclosed herein. The composite point may combine the stable point feature with virtual point feature. Accordingly, the user can use the DSL to specify a stable virtual point. The system performs assessment by combining observed body landmark vectors in each frame and uses those composed vectors as components in measured angles. In several definitions, based on DSL specification, each angle is a combination of directly observed landmarks and composed landmarks, to match standard definitions of physical therapy measurements. Although the techniques disclosed herein are described in the context of physical therapy measurements, the techniques are not limited to a particular domain and may be used for other domains. For example, the techniques may be used for taking measurements of users for other purposes such as for fashion design, fitting of clothes, creating an exercise routine for an individual, and so on.

Following is the DSL specification for a measurement based on an angle that uses stable points. The following example shows how the DSL specification can combine a stabilized anchor, and a stabilized, composite arm ("from") to achieve a desired angle for shoulder range of motion assessment. The angle is formed by three points, an "anchor" point, a "from" point, and a "to" point. The angle is measured along the direction specified by the "direction" attribute of the angle specification. The angle is measured between (1) a vector V1 from the "anchor" point to the "from" point and (2) a vector V2 from the "anchor" point to the "to" point. The anchor point is specified as a stable point based on the shoulder landmark. The " " from point is also specified as a stable point that is also a virtual point. The x coordinate of the "from" point corresponds to the x coordinate of the shoulder that is specified as a stable point. The y coordinate of the "from" point corresponds to the y coordinate of the landmark hip. The "to" point is specified as the landmark elbow. Note the use of variables such as $rotation_direction, $shoulder would, and others in this example. At run time, variable such as $rotation_direction and $shoulder are substituted for values such as #RotationDirection. Clockwise and #Landmark.LeftShoulder, respectively.

```
{
    "angle": {
        "_type": "Angle",
        "direction": "$rotation_direction",
        "anchor": {
            "_type": "StablePoint",
            "landmark": "$shoulder"
        },
        "from": {
            "_type": "StablePoint",
            "x": {
                "_type": "StablePoint",
                "landmark": "$shoulder"
            },
            "y": "$hip"
        },
        "to": {
            "_type": "Point",
            "landmark": "$elbow"
        }
    }
}
```

The use of stable points provides reliable points based on landmarks for taking measurements.

Figure 13:
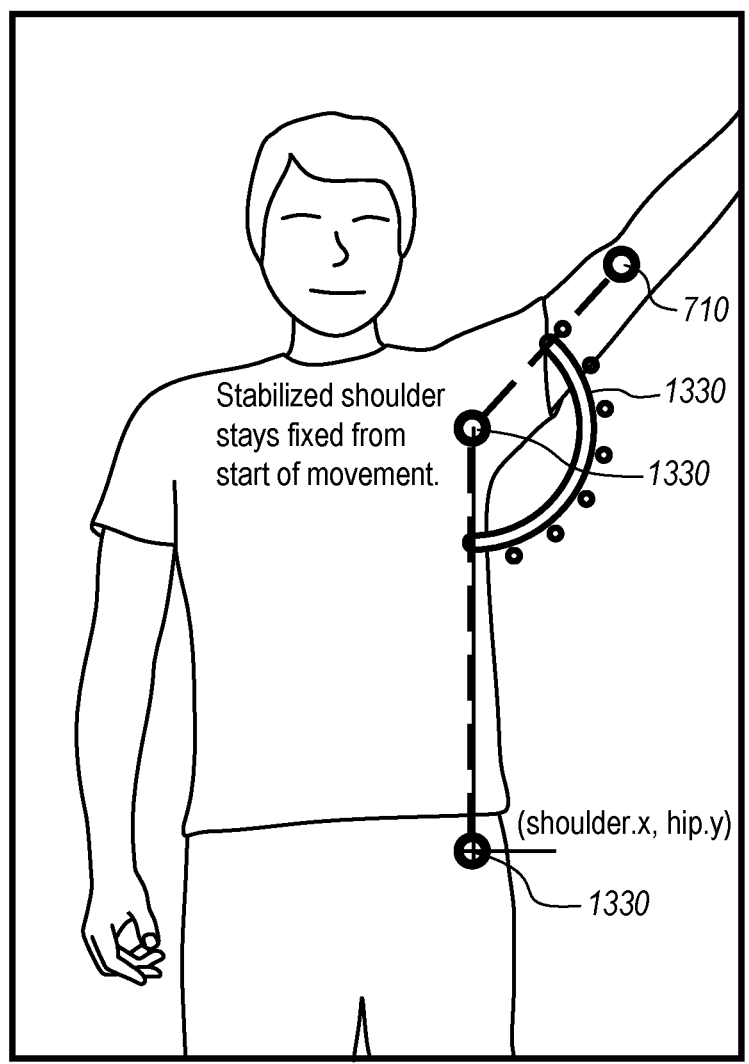
FIG. 13 illustrates a stable point specified using landmarks, according to an embodiment.

FIG. 13 illustrates use of a stable point for taking measurements, according to an embodiment. FIG. 13 shows a stabilized shoulder with a composite hip. The system generates a stable point based on the techniques disclosed. As a result, point 1330 generated from the landmark shoulder remains stable during the movement of the arm even if the underlying landmark shoulder is moving.

Figure 14:
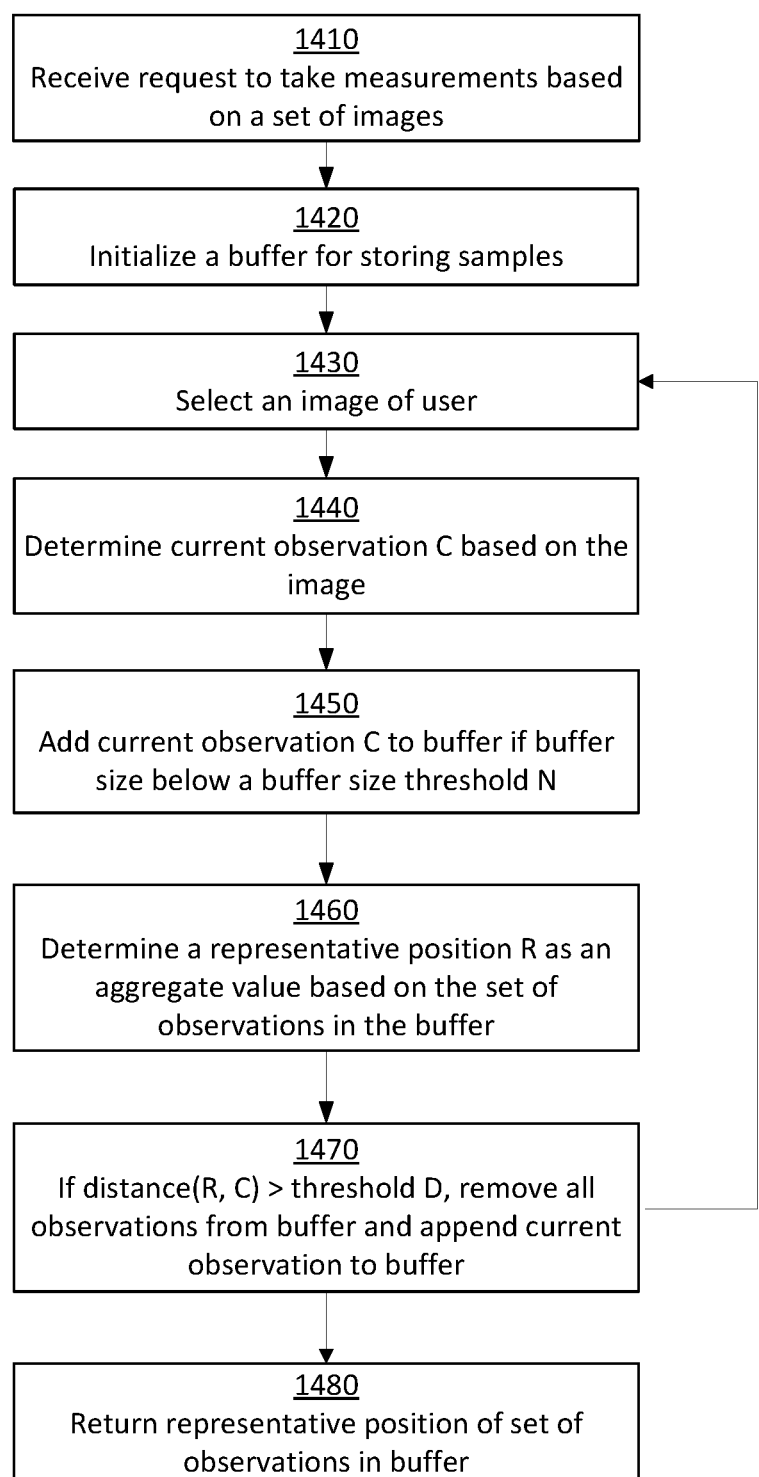
FIG. 14 is a flow chart illustrating the process for executing instructions generated from DSL specification based on stable points, according to an embodiment.

FIG. 14 is a flow chart illustrating the process for executing instructions generated from DSL specification based on stable points, according to an embodiment. The system receives a DSL specification that specifies one or more stable points. An application development system 110 generates instructions based on the DSL specification (for example, using the process 400 shown in FIG. 4). The instructions may be deployed for execution on any system (for example, a client device 120) or on an online system (for example, the application development system 110).

The system receives a 1410 request to take measurements based on a set of images captured by a camera (for example, camera of the client device 120). The images show a user 125 and capture movements by the user. According to an embodiment, the images are captured by a user as part of the process 500 shown in FIG. 5. The process uses value thresholds that are predefined. These include value N, representing a buffer size threshold, and a value D, representing a distance threshold. The distance threshold represents a tolerance threshold for deviation from a representative value based on the samples (for example, the mean sample).

The system initializes a buffer for storing observations based on the images. The buffer may be initialized as an empty set of observations or may be initialized with one or more observations. Each observation associated with an image determines values of points based on the image. The points correspond to landmarks as specified by the DSL specification. The points of each observation include at least a point $P_s$ identified as a stable point in the DSL specification. The point $P_s$ is assumed to be based on a landmark $L_s$. The point $P_s$ may be a virtual point defined based on a plurality of landmarks.

The system repeats the steps 1430, 1440, 1450, 1460, 1470, 1480, for each image processed to generate another observation. The system selects 1430 an image of the user.

The system determines 1440 a current observation C based on the image. The observation includes values of various points based on landmarks. The current observation C includes a value $P_{sl}$ of the landmark $L_s$. The value of each point is represented using a set of coordinates (for example, x and y coordinates).

The system adds 1450 the current observation C to the buffer if the buffer size value is below the buffer size threshold N. The system determines 1460 a representative position $P_r$ as an aggregate value based on the set of observations in the buffer. For example, the representative position R may be determined as the average of all positions of the observations in the buffer. Other embodiments may use other representative values (for example, median or another measure of aggregate value based on the observations).

The system determines a measure of distance between the position $P_{sl}$ of the landmark $L_s$ based on the current observation and the position $P_r$ of the landmark $L_s$ based on the representative observation (i.e., distance $(P_s, P_r)$). The distance may be a Euclidean distance or may be based on any other measure of distance. The distance, according to an embodiment, is measured in terms of numbers of pixels. The system determines whether the distance $(P_s, P_r)$ is greater than the distance threshold D. If the distance $(P_s, P_r)$ is greater than the distance threshold D, the system removes 1470 all observations from the buffer and appends the current observations to the buffer.

The system returns the representative position $P_r$ based on the set of observations in the buffer at the end of the iterations that process all the observations. Accordingly, the representative position $P_r$ based on the set of observations in the buffer represents the value of the stable point corresponding to the landmark $L_s$.

The system can maintain stabilization samples and compute stabilizations for an arbitrary number of points per measurement. The use of stable points and virtual points improves the accuracy of measurements taken by the system. Furthermore, the use of stable points allows the system to stabilize measurements when landmarks expected to stay in one position move across images.

Furthermore, the use of DSL to generate applications allows fast development of applications with different capabilities. The use of DSL allows easy maintenance of the application specification since the amount of code that a developer manages is much smaller than the amount of code that a developer has to manage if the application was written in a low-level programming language, such as JAVA or PYTHON. Furthermore, the DSL specification takes less storage, making it efficient to store and transmit. The use of syntax such as JSON allows easy serializability of the DSL specification, making it easy to store in a relational table or file system as well as easy to transmit across machines over networks.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient, at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like refer to the action and processes of a computer system, or similar electronic computing device, that manipulates and transforms data represented as physical (electronic) quantities within the computer system memories or registers or other such information storage, transmission, or display devices.

Certain embodiments described herein include process steps and instructions described in the form of an algorithm. It should be noted that the process steps and instructions of the embodiments could be embodied in software, firmware, or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer-implemented method for generating applications based on a domain specific language (DSL), the computer-implemented method comprising:
   receiving DSL specification for an application for taking measurements for providing to a physiotherapy expert, the DSL specification comprising a set of DSL commands including at least a DSL command using a virtual point defined using coordinates of a plurality of landmark body parts of an input user, each landmark body part of the input user displayed in an image;
   compiling the DSL specification to generate a set of instructions, wherein the set of instructions cause a device to perform steps for taking measurements by a user for providing to a physiotherapy expert, the steps comprising:
   receiving one or more images of the user;
   identifying the plurality of landmark body parts of the user displayed in the image, the plurality of landmark body parts used for defining the virtual point;
   determining based on the one or more images of the user, coordinates representing positions of each of the plurality of landmark body parts;
   determining coordinates of the virtual point as a combination of coordinates representing positions of each of the plurality of landmark body parts; and
   determining a particular measurement based on the virtual point; and
   deploying the set of instructions on a computing system causing the computing system to take a set of measurements including the particular measurement and provide the set of measurements to a target system for review.

2. The computer-implemented method of claim 1, wherein the virtual point has an x coordinate and a y coordinate, wherein the x coordinate is determined using a first landmark body part and the y coordinate is determined using a second landmark body part.

3. The computer-implemented method of claim 2, wherein the DSL command for taking the particular measurement based on user movement specifies an angle based on an anchor point, a first point, and a second point, wherein at least one of the anchor point, the first point, or the second point is a virtual point, wherein instructions generated for the DSL command are configured to determine the angle between a first vector formed by the anchor point and the first point and a second vector formed by the anchor point and the second point.

4. The computer-implemented method of claim 1, wherein the virtual point has an x coordinate and a y coordinate, wherein the x coordinate of the virtual point is determined using an x coordinate of a first landmark body part and the y coordinate of the virtual point is determined using a y coordinate of a second landmark body part.

5. The computer-implemented method of claim 1, wherein the DSL specification includes a first DSL command to start recording and a second DSL command to stop recording, wherein the DSL specification further includes one or more DSL commands for taking the particular measurement between the first DSL command and the second DSL command.

6. The computer-implemented method of claim 1, wherein the set of instructions is deployed on a client device equipped with a camera, wherein the client device executes the set of instructions.

7. The computer-implemented method of claim 1, wherein the set of instructions is deployed on an online system that interacts with a client device equipped with a camera, wherein the client device sends requests to the online system to execute the set of instructions.

8. A non-transitory computer readable storage medium for storing instructions that, when executed by one or more computer processors, cause the one or more computer processors to perform steps for generating applications based on a domain specific language (DSL), the steps causing the one or more computer processors to perform steps comprising:

receiving DSL specification for an application for taking measurements for providing to a physiotherapy expert, the DSL specification comprising a set of DSL commands including at least a DSL command using a virtual point defined using coordinates of a plurality of landmark body parts of an input user, each landmark body part of the input user displayed in an image;

compiling the DSL specification to generate a set of instructions, wherein the set of instructions cause a device to perform steps for taking measurements by a user for providing to a physiotherapy expert, the steps comprising:

receiving one or more images of the user;

identifying the plurality of landmark body parts of the user displayed in the image, the plurality of landmark body parts used for defining the virtual point;

determining based on the one or more images of the user, coordinates representing positions of each of the plurality of landmark body parts;

determining coordinates of the virtual point as a combination of coordinates representing positions of each of the plurality of landmark body parts; and determining a particular measurement based on the virtual point; and deploying the set of instructions on a computing system causing the computing system to take a set of measurements including the particular measurement and provide the set of measurements to a target system for review.

9. The non-transitory computer readable storage medium of claim 8, wherein the virtual point has an x coordinate and a y coordinate, wherein the x coordinate is determined using a first landmark body part and the y coordinate is determined using a second landmark body part.

10. The non-transitory computer readable storage medium of claim 9, wherein the DSL command for taking the particular measurement based on user movement specifies an angle based on an anchor point, a first point, and a second point, wherein at least one of the anchor point, the first point, or the second point is a virtual point, wherein instructions generated for the DSL command are configured to determine the angle between a first vector formed by the anchor point and the first point and a second vector formed by the anchor point and the second point.

11. The non-transitory computer readable storage medium of claim 8, wherein the virtual point has an x coordinate and a y coordinate, wherein the x coordinate of the virtual point is determined using an x coordinate of a first landmark body part and the y coordinate of the virtual point is determined using a y coordinate of a second landmark body part.

12. The non-transitory computer readable storage medium of claim 8, wherein the DSL specification includes a first DSL command to start recording and a second DSL command to stop recording, wherein the DSL specification further includes one or more DSL commands for taking the particular measurement between the first DSL command and the second DSL command.

13. The non-transitory computer readable storage medium of claim 8, wherein the set of instructions is deployed on a client device equipped with a camera, wherein the client device executes the set of instructions.

14. The non-transitory computer readable storage medium of claim 8, wherein the set of instructions is deployed on an online system that interacts with a client device equipped with a camera, wherein the client device sends requests to the online system to execute the set of instructions.

15. A computer system comprising:

one or more computer processors; and a non-transitory computer readable storage medium for storing instructions that, when executed by the one or more computer processors, cause the one or more computer processors to perform steps for generating applications based on a domain specific language (DSL), the steps causing the one or more computer processors to perform steps comprising:

receiving DSL specification for an application for taking measurements for providing to a physiotherapy expert, the DSL specification comprising a set of DSL commands including at least a DSL command using a virtual point defined using coordinates of a plurality of landmark body parts of an input user, each landmark body part of the input user displayed in an image;

compiling the DSL specification to generate a set of instructions, wherein the set of instructions cause a device to perform steps for taking measurements by a user for providing to a physiotherapy expert, the steps comprising:

receiving one or more images of the user;

identifying the plurality of landmark body parts of the user displayed in the image, the plurality of landmark body parts used for defining the virtual point;

determining based on the one or more images of the user, coordinates representing positions of each of the plurality of landmark body parts;

determining coordinates of the virtual point as a combination of coordinates representing positions of each of the plurality of landmark body parts; and determining a particular measurement based on the virtual point; and deploying the set of instructions on a computing system causing the computing system to take a set of measurements including the particular measurement and provide the set of measurements to a target system for review.

16. The computer system of claim 15, wherein the virtual point has an x coordinate and a y coordinate, wherein the x coordinate is determined using a first landmark body part and the y coordinate is determined using a second landmark body part.

17. The computer system of claim 16, wherein the DSL command for taking the particular measurement based on user movement specifies an angle based on an anchor point, a first point, and a second point, wherein at least one of the anchor point, the first point, or the second point is a virtual point, wherein instructions generated for the DSL command are configured to determine the angle between a first vector formed by the anchor point and the first point and a second vector formed by the anchor point and the second point.

18. The computer system of claim 15, wherein the virtual point has an x coordinate and a y coordinate, wherein the x coordinate of the virtual point is determined using an x coordinate of a first landmark body part and the y coordinate of the virtual point is determined using a y coordinate of a second landmark body part.

19. The computer system of claim 15, wherein the DSL specification includes a first DSL command to start recording and a second DSL command to stop recording, wherein the DSL specification further includes one or more DSL commands for taking the particular measurement between the first DSL command and the second DSL command.

20. The computer system of claim 15, wherein the set of instructions is deployed on one of:

(1) a client device equipped with a camera, wherein the client device executes the set of instructions, or (2) an online system that interacts with a client device equipped with a camera, wherein the client device sends requests to the online system to execute the set of instructions.

\* \* \* \* \*